INVENTORS
H.C.A. van DUUREN
H. da SILVA
BY
ATTY.

MULTI-CHANNEL TELE-COMMUNICATION SYNCHRONIZATION SYSTEM

Filed Dec. 24, 1964 4 Sheets-Sheet 2

INVENTORS
H.C.A. van DUUREN
H. da SILVA
BY
Hugh A. Kirk
ATTY.

Jan. 18, 1966 H. C. A. VAN DUUREN ETAL 3,230,309

MULTI-CHANNEL TELE-COMMUNICATION SYNCHRONIZATION SYSTEM

Filed Dec. 24, 1964 4 Sheets-Sheet 3

INVENTORS
H. C. A. van DUUREN
H. da SILVA
BY
ATTY.

Jan. 18, 1966 H. C. A. VAN DUUREN ETAL 3,230,309

MULTI-CHANNEL TELE-COMMUNICATION SYNCHRONIZATION SYSTEM

Filed Dec. 24, 1964 4 Sheets-Sheet 4

INVENTORS
H. C. A. van DUUREN
H. da SILVA

BY [signature]

ATTY.

3,230,309

MULTI-CHANNEL TELE-COMMUNICATION SYNCHRONIZATION SYSTEM

Hendrik Cornelis Anthony van Duuren, Wassenaar, and Herman da Silva, Voorburg, Netherlands, assignors to de Staat der Nederlanden, ten deze Vertegenwoordigd Door de Directeur-Generaal der Posterijen, Telegrafie en Telefonie, 12 Kortenaerkade, The Hague, Netherlands Filed Dec. 24, 1964, Ser. No. 421,026
22 Claims. (Cl. 178—53)

Figure 1:
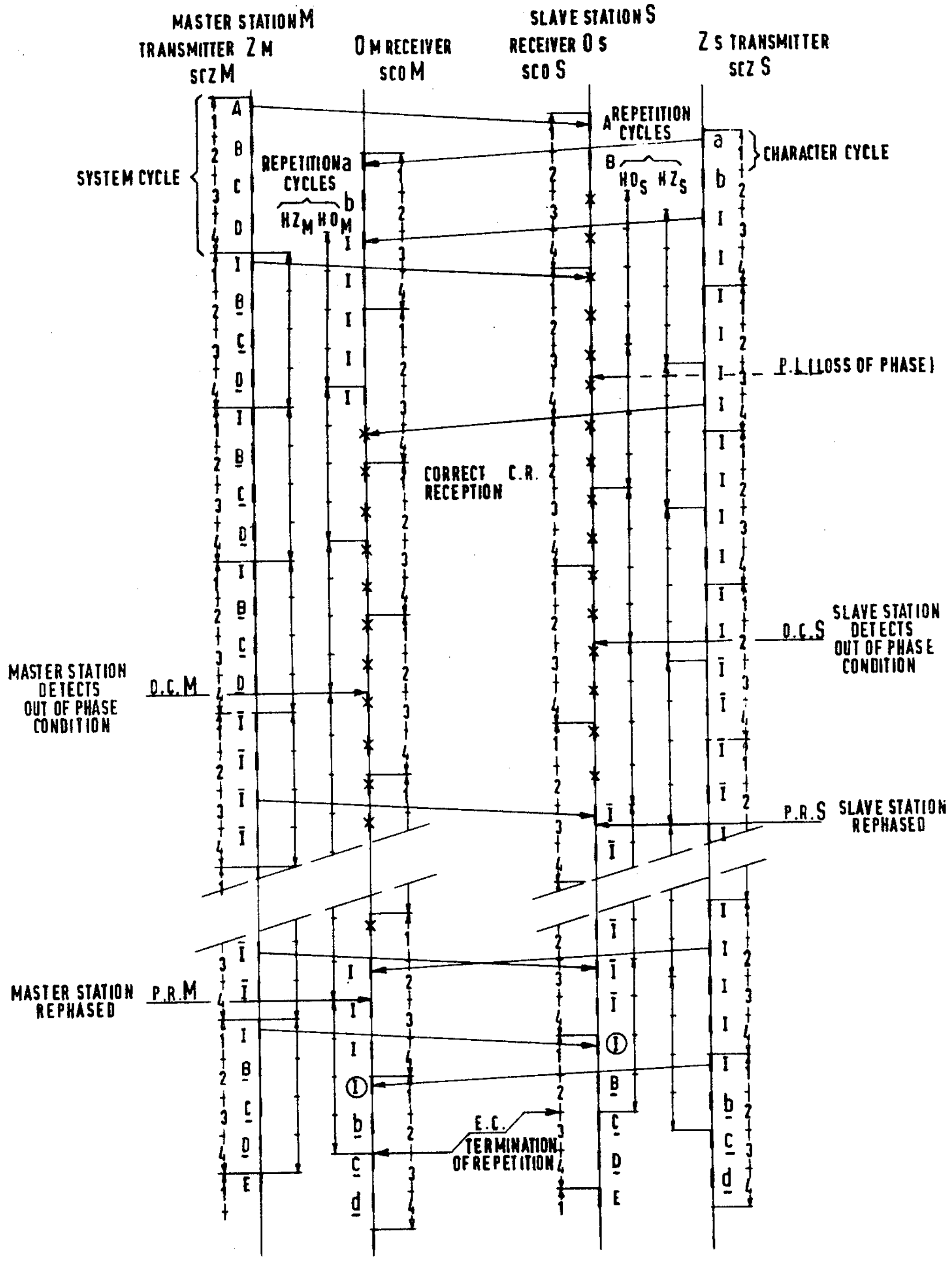

This invention relates to a system for synchronizing multi-channel two-way telegraph traffic. More particularly, it deals with a multi-channel communication of multi-element signal characters according to a predetermined cyclic pattern of channels and characters, including the automatic detection and correction of errors and disturbances in the communication by a cyclic repetition of the characters which were faulty, and the automatic rephasing or synchronization of the cyclic pattern in the event it gets out-of-phase during such a repetition. These cyclic patterns comprise a predetermined number of polarity converted character cycles of each channel, which form a "system cycle" within the CCIR Recommendation No. 242 for multi-channel systems of the International Radio Consultative Committee Documents of the IX Plenary Assembly at Los Angeles in 1959, volume 1, pages 130 through 133, published by the International Telecommunications Union, Geneva, Switzerland (1959).

This application is a continuation-in-part application of applicants' copending parent application Serial No. 145,659 filed Oct. 17, 1961 for "System for Two-Way Telegraph Traffic."

By "system cycle" is meant a cycle with the same number of "character cycles" (or revolutions of a distributor) as in the "repetition cycle" employed in the automatic error detection and repetition or the ARQ systems. By "character cycle" is meant the time required to complete one character of each channel on a synchronous path, that is, each character being made up of an equal number of multi-element binary signals.

In previous duplex telegraph systems, the system cycle was marked by means of a pattern of polarity conversion, and in each station the transmitting system cycle was started for the transmitter with the transmission of the first signal, and this system cycle is repeated continually without interruption until the final closing down of the traffic. The system cycle of the receiver was initially lined-up or brought in-phase with the system cycle for the far end transmitter, and thus remained without getting out-of-phase except under the condition of loss of signals during repetition, and then the system was automatically rephased without the loss of characters or the double printing of any characters. The stations of these systems have a transmitting distributor and a receiving distributor and cooperate according to a schedule from which it is known which station in a given traffic connection will act as the master station and which will act as the slave station. Thus the receiver at each station must adjust itself continuously to the arriving signals, and it thus keeps in-phase as long as no mutilation or repetition occurs. The transmitting distributor in the master station is autonomous and controls the whole system, since in each slave station the receiving distributor is directly coupled to its transmitting distributor, so that it is regulated along with each element of each signal as it is received.

Several patent applications deal with the possibility of the loss of synchronism during prolonged disturbances in such prior systems, including applicants' copending U.S. patent applications Serial No. 1,313, filed Jan. 8, 1960, now U.S. Patent No. 3,156,767 issued Nov. 10, 1964 and Serial No. 86,404, filed Feb. 1, 1961. These applications however relate to general or initial synchronization. In application Serial No. 1,313, the synchronism is locked during repetition and then the functions of the master and slave stations are reversed after the repetition has been completed and special service signals are transmitted from the original slave station until the original master station is in synchronism again and can take over its function as master station again. In application Serial No. 86,404, the repetition cycle ends on only the third or the fourth character revolution, depending upon the propagation time between the two stations. Although both of these prior applications deal with systems for the automatic rephasing or re-synchronizing of signals during repetition once synchronization is lost, they do not deal with this situation in the same manner or for a multi-channel system having more than two channels, as does the system of this present invention.

Accordingly it is an object of the present invention to provide a multi-channel telecommunication system having automatic error correction by repetition, for insuring that the phasing of all the channels is the same at both the beginning and the end of each repetition thereby preventing both the loss of characters and the double printing of characters after correction of a faulty communication.

Another object of the present invention is to provide a unique pattern of character cycles in each of a plurality of channels to provide a unique system and repetition cycle pattern which avoids misphasing of any of the channels in the system.

Another object is to provide such a multi-channel unique polarity conversion pattern which is related to and improves the CCIR Recommendation No. 242 of the International Radio Consulting Committee for the inversion of multi-channel signals, and specifically for a four-channel system.

Another object of the invention is to provide means in such a multi-channel system for detecting an out-of-phase condition during a repetition period for automatic error correction, and to bring the multi-channel system back into phase before the expiration of said repetition period.

Another object is to provide a means in such a system for counting the number of one type of polarity elements, such as mark elements, in a whole system cycle during repetition to determine an out-of-phase condition.

Another object is to provide means in such a system for skipping one element at a time and/or character cycles at a time in the system cycle until an in-phase condition can be detected.

Another object is to provide means in such a system for generating and then inverting a special service signal or character on all the channels for indicating an out-of-phase condition.

Another object is to provide means in such a system for rephasing the slave stations only on inverted special service signals and for re-phasing the master stations only on direct special service signals.

Generally speaking, when a system with an automatic error detection and repitition device, or an ARQ device, starts a repetition cycle due to faulty reception, it automatically makes the remote station also start a repetition cycle by transmitting special service signals "I." These repetition cycles at near and remote stations of the system are instigated by one of the following conditions:

(a) one station having faulty reception,
(b) the other station having faulty reception, or
(c) both stations having faulty reception.

Once these repetition cycles at each station are established they have a definite phase relationship to each other depending upon the propagation time between the two stations, and this relationship or relative phase position of the two repetition cycles is to be maintained all through the repetition period. If a four character repetition or system cycle is employed and the system locks when in phase with any one character, there are four possible different phase conditions for the two repetition cycles at the near and remote stations, namely (1) they can be in phase, character for character, (2) one character in one station can be in retard by one character to the other station, (3) one character in one station can be in advance by one character to the other station, and (4) one character in one station can be in advance or in retard by two characters to the other station. Since this is a two-way telecommunication system this represents all the possible different character phase conditions between the two stations for a four character cycle system. It is to avoid such mis-phasing between the characters in a system cycle when the characters themselves may be in phase, that a system cycle is provided having a unique pattern characteristic, that is, a system cycle having a polarity conversion pattern which is unique for each character cycle and which is repeated after each system cycle.

According to the CCIR Recommendations No. 242 mentioned above, the polarities of the characters in four-channel systems are as follows:

| Channels | AA | BB | CC | DD |
|---|---|---|---|---|
| Polarity | Direct + | Reversed − | Reversed − | Direct + |

Up to now all ARQ systems operate according to this recommendation for four channel systems. The system cycle, according to this invention has a unique polarity pattern which is related to and improves this recommendation in accordance with the following table:

| Channels | AA | BB | CC | DD |
|---|---|---|---|---|
| 1st character cycle | (−) | − | − | + |
| 2nd character cycle | + | (+) | − | + |
| 3rd character cycle | + | − | (+) | + |
| 4th character cycle | + | − | − | (−) |

The uniqueness of this multi-channel system cycle pattern is shown by polarities of the characters in parenthesis which are diagonally across the above table, from the upper left to the lower right. In other words, the system cycle for four channels according to the present invention has a pattern of inversion made in such a way that the signals in the first channel AA during the first character cycle are inverted with respect to the polarity pattern for the rest of the signals in the other character cycles of the channel AA. In channel BB all of the signals are inverted except that of the second character cycle which is direct or positive. In channel CC all of the signals are inverted except that of the third character cycle which is direct or positive. And lastly, in the channel DD all of the signals are direct except that of the fourth character cycle which is inverted. By doing this, the system cycles are tied in with the channel arrangement.

One of the important and distinguishing features of the system of this invention is in the detection of an out-of-phase condition during the repetition period, that is, when all of the characters on all channels are erroneous but unmutilated during one complete system cycle, and then preventing the termination of the repetition period until an in-phase and synchronous condition is re-established. When an out-of-phase condition is detected by the receiver at any station, special service signals "I" are continuously transmitted on all chanels from such station in polarities opposite to their normally transmitted polarities. These successive inverted special service signals "I" inform the other or remote station of this out-of-phase condition, and then said other or remote station also transmits only the same special service signals "I" on all channels, also successively and inverted. Since the slave station has its receiving and transmitting distributors directly coupled, it is the first station to re-phase itself by skipping elements and/or characters until it is in-phase with the received inverted special service signals "I." As soon as this in-phase condition occurs, the slave station then re-inverts or normally transmits the same successive special service signals "I" so that the master station can then know the slave is in-phase and can re-phase itself by said normally transmitted special service signals "I," since the master station is so contructed that it can only re-phase itself on successive normally received special service signals "I."

At the start of any communication or traffic over the system of this invention, all of the stations are set to act as slave stations, and the station starting the traffic is then switched to act as the master station. Thus in normal unfaulty traffic communication, the slave station is synchronized by each element of each character it receives and the receiver at the master station is synchronized by each element of each character it receives from its slave station, there being a special error correction device at the receiver at each station for this purpose.

Generally speaking the circuits employed for performing these functions, include at each station, a multi-channel receiver and a multi-channel transmitter, with a manual or other special switching device for determining which station is to be the master station and which station is to be the slave station. Common to all of the channels in each station, there are provided, for the aggregate multi-channel signal, a radio transmitter connected to a keyer and a radio receiver connected to a correction device for each element signal of each character on all the channels as they are received. Also each station has common for all channels, separate pulse generators connected to separate receiver and transmitter distributors, which in turn are connected to corresponding receiver and transmitter channel indicators, and to corresponding receiver and transmitter system cycle counters. In addition each receiver has common for all of the channels an out-of-phase detector, an inverter for the special service signals "I," to be transmitted, means for skipping the receiver distributor until it is in phase, and means for detecting when the signals are in-phase again. The out-of-phase detector comprises a $2^6$ trigger counter for counting 56 separate positive marks or elements, which is the number of marks which occur in the four seven-element characters "I," inverted or not, in the four channels of a system cycle, namely half of the 112 elements in equal numbers of 4/3 and 3/4 element ratio characters according to the unique polarity pattern shown in the above mentioned table. Common for the channels and controlling the keyer is a special gating circuit for the inversions of the special service signals "I" during repetition for re-phasing.

Each of the channels in the receiver is provided with its own inverted or direct receiving circuit connected to receiving triggers which in turn are connected to a code converter for converting the seven-element coded characters back to five-element coded characters and then adding to each character a "stop" and "start" signal element, the output of which is connected to a blocking circuit for blocking the characters from the printer, in the event a repetition is requested and in progress. Each receiver channel circuit also is provided with a fault detector circuit connected to the inverted and direct receiving circuit, direct and inverted special service signal "I" detectors connected to said receiving triggers, and a repetition device connected to said direct signal "I" detector and to said fault detector, which repetition device in turn controls said blocking circuit.

Each of the channels in the transmitter is provided with its own code converter for receiving the five-element telegraph code from a reader and converting it to the seven-element constant ratio code to which the gating circuit for the keyer and to which a three-character storage device are each connected. In the case of a repetition a special signal "I" generator is provided with means for connecting it also to said gating circuit for said keyer. Both the storage device and the signal "I" generator are controlled by this channel's associated receiver's direct signal "I" and fault detectors.

Figure 2A:
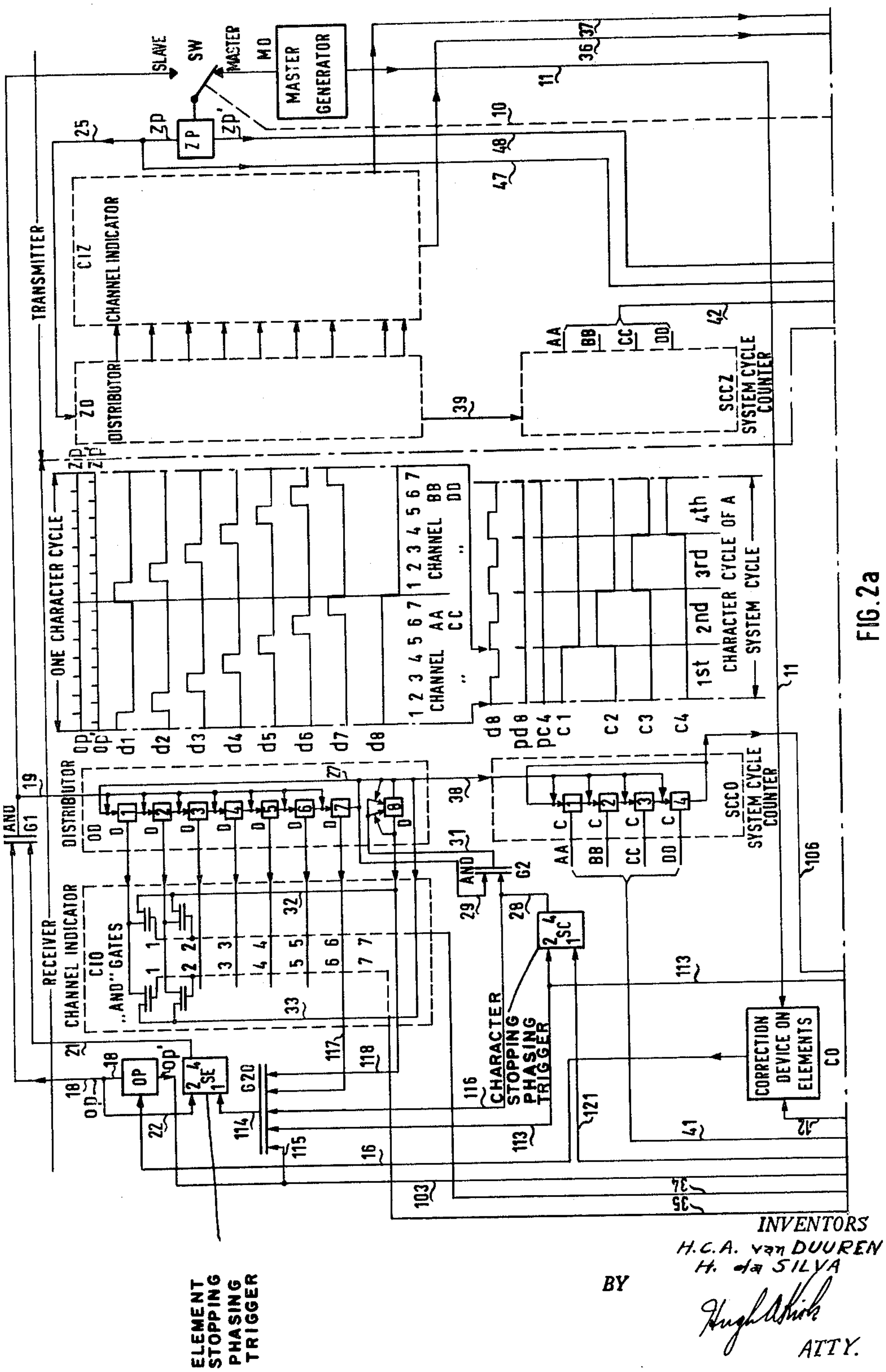
Figure 2B:
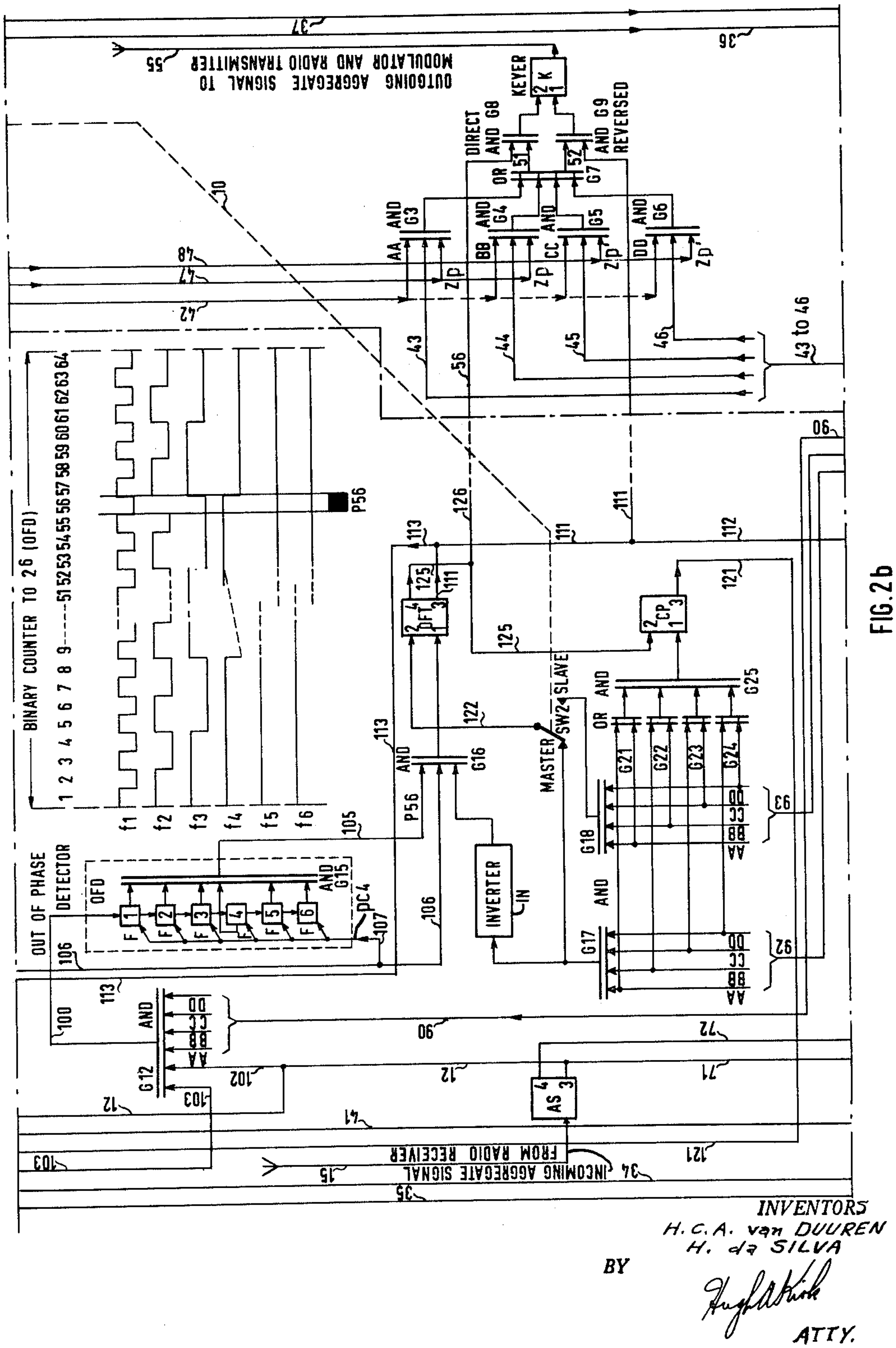
Figure 2C:
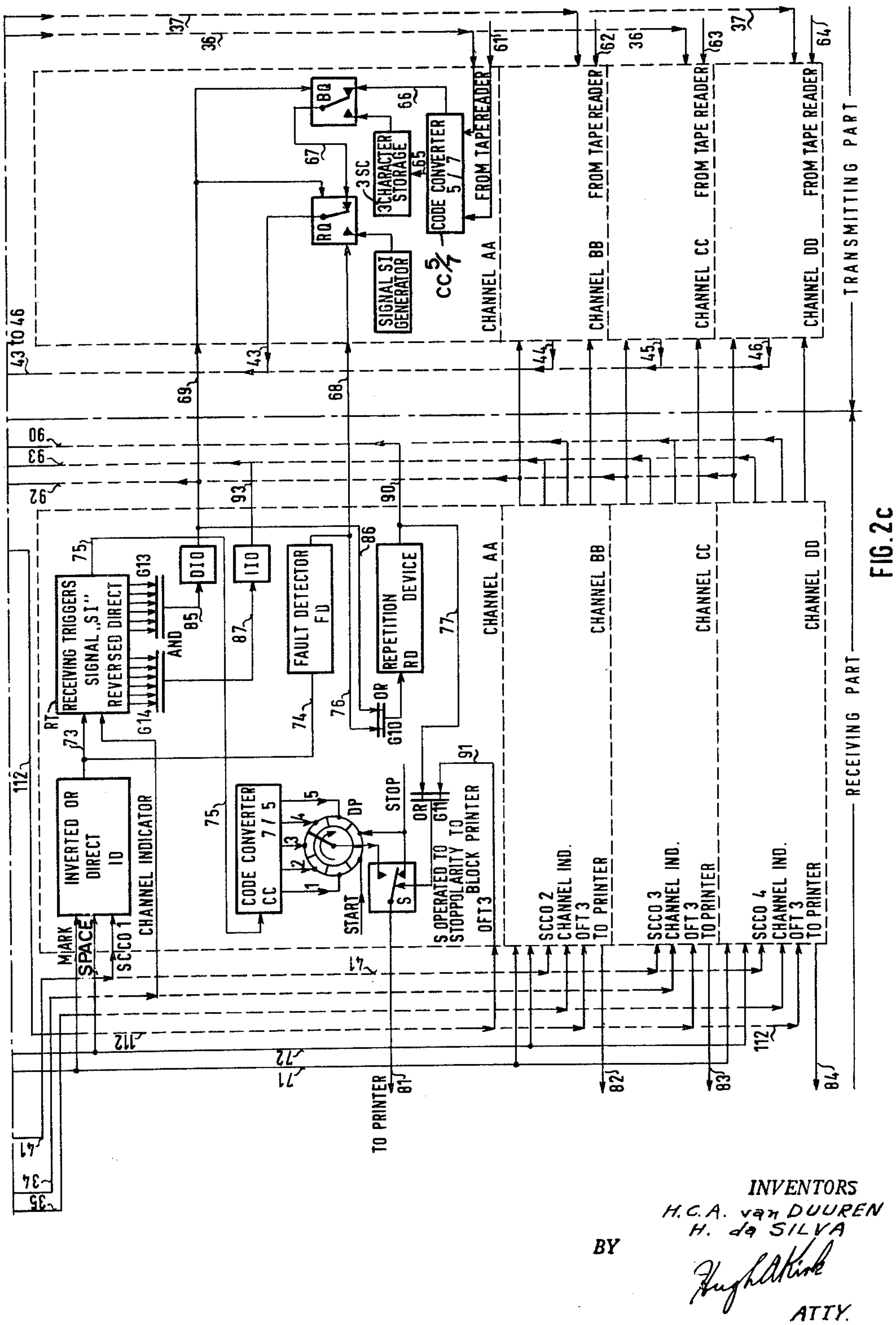

The above mentioned and other features and objects of this invention and the manner of attaining them will become more apparent and the invention itself will be understood best by reference to the following description of an embodiment of the invention taken in conjunction with the accompanying drawings, wherein:

FIG. 1 shows a schematic time diagram for two-way traffic which becomes faulty and thereby is put into repetition during which it becomes out-of-phase and is then put back into phase according to the system of this invention before the repetition period is terminated; and FIGS. 2*a*, 2*b*, and 2*c*, which in combination form a schematic block wiring diagram of a four channel system using a four character repetition and system cycle according to one embodiment of the present invention; FIG. 2*a* disclosing the receiver and transmitter distributors, channel indicators, and system cycle counters common for all the channels; FIG. 2*b* disclosing the out-of-phase detector and inverter circuit in the receiver, and the keyer and gating circuits therefor in the transmitter, common for all the channels, and FIG. 2*c* disclosing the block wiring diagram of one of the four similar but separate receivers and one of the four similar but separate transmitters for each of the four channels shown.

I.—FUNCTIONAL OPERATION

Referring first to FIG. 1 there is shown a schematic time diagram for the operation of the apparatus shown in FIGS. 2*a*, 2*b*, and 2*c*. In FIG. 1, time is plotted from the top to the bottom and the left half relates to the master station M transmitter Z*m* and receiver O*m* of character signals, and the right half relates to the slave station S, receiver O*s* and transmitter Z*s*. Since the elements of the character communicated in channels AA and CC are interlaced with each other as are the elements of the channels BB and DD, for the purpose of simplicity, the channels AA and BB are alternately indicated along the vertical lines as heavy and light dashes during each character cycle 1, 2, 3 and 4 of each system cycle, and only the duplex operation of one channel for the transmission of characters "A," "B," "C," "D" etc., from the master station M and of characters "*a*," "*b*," "*c*," "*d*," etc., from the slave station S are shown. The repetition cycles of four characters, which occur in the case of mutilation and automatic correction and rephasing, are shown along the central two lines HZ*m*, HO*m*, HO*s* and HZ*s* of each of the station M and S sections. The transverse slanting lines connecting the same characters in the two station sections represent the propagation time between said stations.

I–1.—MUTILATION AND START OF REPETITION

According to FIG. 1, the first two characters or letters "A" and "B" from the master station M and letters "*a*" and "*b*" from the slave station S are correctly received, but during the receiving period of the letter "C" at the slave station, there occurs a fault or mutilation which is indicated by an "*x*" or cross across the vertical line O*s* where the letter or character "C" should have occurred. As soon as such a fault or mutilation is detected by the slave station S, the repetition cycle HO*s* is started, the first revolution or character cycle of which coincides with the third character cycle of the system cycle SCO*s* of the slave station receiver O*s*. In consequence of this, the slave station transmitting repetition device starts repetition cycle HZ*s*, with the same third character phase relation to the system cycle SCZ*s* of the slave station transmitter Z*s* by transmitting only normal special service signals "I." The first of these special service signals "I" is correctly received at the master station M during the third character cycle of the system cycle SCO*m* of the master station receiver O*m*. In consequence of this the repetition cycle HO*m* starts at the master station M, also coinciding with the third character cycle of the system cycle SCO*m* at the master station. Thus at the first character cycle of the second system cycle SCZ*m* at the master station transmitter Z*m*, the repetition device of the master station M starts repetition cycle HZ*m* which herein is in phase or coincides with the transmitter system cycle SCZ*m*. The master station now transmits a special service signal "I" followed by the letters "B," "C" and "D" from memory as the first repetition cycle from the master station. In FIG. 1, these characters or letters transmitted from the memory are distinguished from the other characters transmitted by being underlined. The slave station S however receives nothing yet, even after a second repetition cycle, as shown by the crosses "*x*" across the line SCO*s* of the slave station receiver OS, indicating that the reception is still faulty.

I–2.—OUT-OF-PHASE

Now it is supposed that the receiving conditions at the slave station S becomes good again, which is indicated at the time point C.R., however due to previous loss-of-phase at the time location P.L. (which as yet has not been detected because no correct characters have been received), the slave station S still receives errors. The master station M receiver O*m*, however, has detected an error as soon as the loss-of-phase occurred. It is not, however, until the end of the third repetition cycle HO*s* at time D.C.*s* that this loss-of-phase is detected at the slave station S by means of the 56/56 test or mark element counter, during a completely received repetition cycle of signals "I," or the complete reception of 112 consecutive elements. As soon as this out-of-phase condition is detected at the slave station S, the special service signals "I" are immediately inverted to their normal transmission, according to the pattern of the table above, on all channels for each character in each character cycle, which is indicated in FIG. 1 by the lines above each of the special service signals "I" now being transmitted from the slave station transmitter Z*s*. As there is a fixed coupling between the transmitter and receiver at the slave station S, the loss-of-phase at this station S also entails the loss-of-phase between the transmitter Z*s* and receiver O*m* at the master station M, which is detected at the master station M at point D.C.*m* after the 56/56 test of a completely received repetition cycle of normal special signals "I" with fault detection for each character in said cycle. After this, the master station M only transmits inverted special signals "I."

I–3.—REPHASING

After a few character cycles, the slave station S has entered into phase again by a number of element and/or character jumps as mentioned above and will be described in detail later. This in-phase condition of the slave station S with the master station transmitter Z*m* is detected at the slave station receiver O*m* by the arrival of a non-faulty or properly received inverted special service signal "I" at the moment P.R.*s*. In consequence of this, the circuit from the master station M to the slave station S is now in-phase, since the slave station can only phase itself with the master station M on inverted special service signals "I" received from the master station Z*m*. At this time the signals received at the master station O*m* from the slave station Z*s* are still considered to be incorrect or faulty, in view of which fact the slave station S continues to transmit special service signals "I," but instead of being inverted, it now transmits them normally so that the master station receiver O*m* can get in-phase, which normal signals "I" are the only types of signals upon which the master station receiver O*m* can rephase itself. This re-phasing of the master station receiver O*m* occurs at the instant P.R.M. in FIG. 1; the time during which the master station M is in search of its correct phase being shown to be interrupted by the parts broken away in the vertical lines.

When the receiver O*m* at the master station M first detects the proper normally transmitted special service signals "I" at moment P.R.M., it is in-phase with the transmitter Z*s* of the slave station S, which herein occurs during the second character cycle of the system cycle SCO*m*.

I-4.—TERMINATION OF REPETITION

Now the transmission from the master station M immediately returns to normal, and re-transmits the initially transmitted repetition cycle consisting of the normally transmitted special service signal "I" followed by the letters "B," "C," and "D" from the memory device. In FIG. 1 to indicate that this special service signal "I" is the start of the final repetition cycle and not for re-phasing, it has been encircled, and it arrives at the slave station S during the third character cycle of the repetition cycle HO*s* and indicates that this is the final or last repetition cycle.

As soon as the slave station receives this special service signal "I" of the final repetition cycle, it stops transmitting only normal special service signals "I" and transmits its final repetition cycle including one special service signal "I" in the first character cycle followed by the three letters "*b*," "*c*" and "*d*" from the memory of the slave station S, which repetition cycle coincides with the system cycle SCO*m*. This service signal "I" when received at the master station M is also encircled to indicate the start of the last repetition cycle.

Then as soon as the new characters are received at each station which have not been printed, the repetition is terminated as is indicated at the points E.C. Thus, notwithstanding the loss-of-phase during a repetition period, no characters have been lost or doubly printed.

II.—APPARATUS AT EACH STATION

Referring now to the schematic block wiring diagram at one of the stations according to the system of this invention shown in FIGS. 2*a*, 2*b* and 2*c*, reference is first had to the common circuits for all four of the channels AA, BB, CC and DD, which common circuits are shown in FIGS. 2*a* and 2*b*.

*A.—Common circuits for all channels*

1.—MASTER-SLAVE SWITCHING DEVICE

Normally when the system is in operation, the master-slave switches SW and SW2 shown in the upper right hand corner of the FIG. 2*a* and the left center of FIG. 2*b*, respectively, and connected by dotted line 10 are positioned in their "slave" positions, so that each station is ready to receive traffic from any other station in the network. The station which is first to start the traffic changes the switches SW and SW2 into their "master" positions, as shown in full-lines in the FIGS. 2*a* and 2*b*, thereby becoming a master station. Under this condition, the master generator MO shown in the upper right of FIG. 2*a*, is directly connected through the master/slave switch SW to transmitter pulse generator ZP, such as a 100 cycles per second oscillator, and also via conductor 11 to the associated correction device on elements CO which is connected via conductor 12 to the aggregate signal receiving trigger AS shown at the left of FIG. 2*b*, for receiving all signals of all channels from the radio transmitter, herein indicated by the receiving antenna 15 in the upper left corner of FIG. 2*b*. This correction device CO controls via conductor 16 the receiver pulse generator OP to be in synchronism with each element of all of the signals received. This receiver pulse generator also may be 100 cycles/*s* oscillator, and it has two outputs 180° out-of-phase with each other. One output produces pulses *op* every ten milliseconds via conductor 18 to the "and" gate G1 to control, via conductor 19, the receiving distributor OD. This "and" gate G1 is also controlled via conductor 21 by phase hunting trigger SE which is normally in its "off" position thereby maintaining a potential via conductor 21 to gate G1 so that each pulse *op* can normally pass through said gate G1 to operate the distributor OD. This trigger SE only blocks gate G1 when the distributor OD is to jump during phase hunting described in section II-D-2 below.

Trigger SE, as all the trigger circuits shown in these FIGS. 2, is shown as a square with its terminals numbered 1, 2, 3 and 4 at each of the four corners thereof, with its two input terminals 1 and 2 on its left side and its output terminals 3 and 4 on its right side. When the trigger is "off" the input terminal 2 and the output terminal 4 are energized, and when the trigger is "on" the input terminal 1 and the output terminal 3 are energized.

Similarly the transmitter pulse generators ZP generates pulses *zp* every ten milliseconds via conductor 25 connected to the transmitter distributor ZD, however, these pulses *zp* need not necessarily be in exact phase with pulses from the pulses of generator OP, in view of the corrections which may be made by the correction circuit CO between the pulse generator OP and the master generator MO.

II-A-2.—THE DISTRIBUTORS

Although in FIG. 2*a* the receiver distributor OD is only shown with the eight triggers D1 through D8 shown therein, there are similar triggers similarly connected in the transmitter distributor circuit ZD. In the receiver distributor OD the incoming pulses *op* through the conductor 19 successively operate the triggers D1 through D7 in sequence as a shift register, so that each pulse for each element of each seven-element character switches the next trigger in the sequence to its "on" position, and the one previously to its "off" position, and when trigger D7 is reached, its output is conducted via conductor 27 back to the first trigger D1 so as to repeat the cycle for the next seven-element character. This operation of these triggers D1 through D7 is shown in the waveform diagrams in the center of the FIG. 2*a* opposite each of their corresponding triggers D1 through D7 for the twenty milliseconds of one character cycle.

The channel switching trigger D8 in the distributor OD is energized from one of its states to the other at the end of each character cycle by the trigger D7 via "and" gate G2, which is normally energized by the character stopping trigger SC, which has its terminal *sc4* normally connected via conductor 28 to the "and" gate G2, together with the conductor 29 from the output of the trigger D7 of the distributor OD. This trigger SC, like trigger SE previously mentioned, is normally in its "off" position, and is only turned "on" during the process of phase hunting or re-phasing as will be described in Section II-D-2. below.

The output of the "and" gate G2 is connected back to the trigger D8 via conductor 31 so that the operation of the trigger D8 occurs according to the waveform shown adjacent thereto, that is, switching from one channel to another during the interlacing of two channels AA and BB, or CC and DD, during the time of one character cycle, as previously mentioned. Thus, the first 70 milliseconds of each character cycle are for the traffic in channel AA or CC, and the second 70 milliseconds are for the traffic in channel BB and DD.

II-A-3.—THE CHANNEL INDICATORS

The output of each of the first seven distributor triggers corresponding to each of the elements of one character, in the receiver and transmitter distributors OD and ZD, is connected to one of the two inputs of each of a pair of "and" gates in corresponding receiver and transmitter channel indicator circuits CIO and CIZ, with the channel trigger, such as trigger D8 in distributor OD, via conductors 32 and 33, controlling the other of said two inputs to said pairs of gates. Although these "and" gates are only shown in the receiver indicator CIO, similar circuits are also provided in the transmitter indicator CIZ. These channel indicators CIO and CIZ control via these pairs of "and" gates the operation of the separate channel receiving and transmitting circuits shown in FIG. 2*c* via conductors 34 and 35 from the receiver indicator CIO, and via conductors 36 and 37 from the transmitter indicator CIZ. Conductor 34 is for controlling the separation of the received interlaced characters of channels AA and CC and conductor 35 is for controlling the separation of the received interlaced characters of channels BB and DD. Similarly, conductor 36 is for controlling the interlacing of the transmitted characters of channels AA and CC, and conductor 37 is for controlling the interlacing of the transmitted characters of channels BB and DD.

II–A–4.—THE SYSTEM CYCLE COUNTERS

Referring again to FIG. 2*a*, there is connected the receiver system cycle counter SCCO via conductor 38 from the output conductor 33 from the channel trigger D8 in receiver distributor OD. Similarly, the transmitter system cycle counter SCCZ is connected via conductor 39 from the corresponding channel trigger in the transmitter distributor ZD. Each of these counters SCCO and SCCZ comprises a series of four triggers, such as triggers C1, C2, C3 and C4 in the receiver SCCO, which triggers are connected to act as a shift register and be controlled by the pulses *pd*8 derived from the output pulses *d*8 of the channel distributor D8 (see the wave forms adjacent the counter SCCO) in the center of FIG. 2*a*.

These particular triggers C1 through C4 are so connected to correspond to the predetermined polarities of the characters in the channels of the unique polarity pattern of the system cycle of this invention as illustrated in the above disclosed table. Specifically, the system cycle counters running continuously mark consecutive four character cycles. The trigger C1 inverts, when "on," the channel AA signal polarity; the trigger C2 inverts, when "on," the channel BB signal polarity; the trigger C3 inverts, when "on," the channel CC signal polarity; and trigger C4 inverts, when "on," the channel DD signal polarity.

These polarity conversions take place via the conductors 41 from the receiver system cycle counter SCCO to the receiver channel circuits in FIG. 2*c*, and via conductors 42 from the transmitter system cycle counter SCCZ to the gate circuits G3, G4, G5 and G6 before the keyer K shown in the right half of FIG. 2*b*.

II–A–5.—THE KEYER

Referring now to the right half of FIG. 2*b*, there are shown a plurality of gate circuits G3, G4, G5, G6, G7, G8 and G9; gate circuits G3 through G6 and G8 and G9 being "and" gates and gate G7 an "or" gate. The "and" gates G3, G4, G5 and G6 besides having one of each of their inputs connected to corresponding triggers in the system cycle counter SCCZ via conductors 42, have another one of each of their inputs connected to the traffic output conductors 43, 44, 45 and 46 from each of the separate channel transmitter circuits AA, BB, CC and DD, respectively, in FIG. 2*c*. The third inputs to each of these "and" gates G3, G4, G5 and G6 are divided between conductors 47 and 48 for the two pulses *zp* and *zp'*, respectively, from the transmitter pulse generator ZP, channels AA and BB being triggered through gates G3 and G4 by pulses *zp* and channels CC and DD being triggered through gates G5 and G6 by pulses *zp'*. The five milliseconds delay of pulses *zp'* with respect to the pulses *zp*, permits the interlacing of the channel character elements during transmission as follows: element 1 of channel AA, element 1 of channel CC; element 2 of channel AA, element 2 of channel CC; and so on down through; element 7 of channel AA, element 7 of channel CC; then element 1 of channel BB, element 1 of channel DD; element 2 of channel BB, element 2 of channel DD; and so on down through; element 7 of channel BB, element 7 of channel DD; which completes one character cycle of the system cycle according to this invention.

The outputs of each of these "and" gates G3 through G6 are connected through the "or" gate G7 to both the direct and inverted "and" gates G8 and G9, via conductors 51 and 52, which are controlled by the phasing circuits which will be described later in Sections II–D–1 below for completely inverting the special service signals "I" during phase hunting. Thus the two outputs from the "and" gates G8 and G9 are respectively connected to the input terminals 2 and 1 of the keyer trigger K for control of the radio transmitter indicated by antenna 55.

II–B.—THE CHANNEL TRANSMITTER CIRCUITS

Referring now to FIG. 2*c* there is shown in the right half thereof the four channel transmitter circuits for channels AA through DD, the one for channel AA only being shown in detail, but the others are similar thereto. To each of these transmitter channel circuits are connected the separate channel conductors 61 through 64 from their corresponding tape readers. Each said conductor is first connected to a code converter CC5/7, wherein the five element telegraph code signal or character from the tape-reader is converted into a constant-ratio 3/4 seven-element code of this system. The output of this converter CC5/7 in the circuit for channel AA shown is connected via conductor 65 to the three-character storage device 3SC, and also via conductor 66 through back contacts of switching device device BQ, conductor 67, through the back contacts of switching device RQ and then through conductor 43 to the "and" gate G3 in FIG. 2*b*, and thence to the keyer K.

There is also shown in each of the channel transmitter circuits a special signal "I" generator SI connected to the front contacts of the switching device RQ, which device RQ is controlled by the fault detector FD in the corresponding channel receiving circuit at this station via conductor 68 as will be described later. These special service signals "I" are transmitted to request a repetition in the event an error has been detected at the local receiver by the fault detector FD which operates the switching device RQ to connect the output of the generator SI to the conductor 43 instead of the traffic from the code converter CC5/7. On the other hand, if a special service signal "I" is received at this station in this corresponding channel receiver AA, the switching device BQ is operated via conductor 69 to transmit characters from the three-character storage device 3SC instead of the traffic from the code converter CC5/7.

II–C.—THE CHANNEL RECEIVER CIRCUITS

Referring to the left side of FIG. 2*c*, there is shown the four separate channel receiver circuits for channels AA through DD, with only the one for channel AA being shown in detail, although each of the others is similar thereto. Each receiver channel circuit receives all of aggregate incoming traffic signals from the receiving trigger AS in FIG. 2*b* from its two output terminals 3 and 4, correspondingly respectively to the "mark" and "space" elements, via conductors 71 and 72. These conductors 71 and 72 are connected to an inverted or direct receiver selector circuit ID in each channel receiving circuit, which circuits ID are controlled via conductors 41 from the receiver system cycle counter SCCO in FIG. 2*a*, as previously described, to select and pass and/or invert the characters received according to the pattern of the system cycle. The selected characters are then conducted via conductor 73 to the receiving triggers circuit RT. Also from the inverted or direct selector ID, there is connected conductor 74 to the fault detector FD, in order to detect whether any one or more of the elements of the characters selected is faulty.

Assuming that the character is properly received, it is then conducted from the receiving triggers RT via conductor 75 to the receiver code converter CC7/5 to convert the seven-element code signals back into five-element code signals. These five-element code signals are then passed through the printer distributor DP wherein a "start" and "stop" element is added before being passed through a blocking switch S and via output conductor 81 to the corresponding channel printer. The output conductors from the other channel receiving circuits BB, CC and DD are connected to their printers via conductors 82, 83 and 84, respectively. The blocking switch S prevents the channel characters from being printed during automatic error correction and repetition.

In the case a fault is detected via conductor 74 in the fault detector FD, the output of the fault detector FD is conducted via conductor 76 through "or" gate G10 to a repetition device RD. The other output of the fault detector FD is conducted via conductor 68 to operate the RQ switching device in the corresponding channel transmitter circuit to send the special service signals "I" from the generator SI to request a repetition, as previously described.

The repetition device RD controls via conductor 77 the "or" gate G11 to operate the blocking switch S to prevent printing of the characters, as well as cooperating in controlling, via one of the conductors 90, the "and" gate 12 for controlling the out-of-phase detector OFD in the circuit of FIG. 2*b* to be described later. Correspondingly, when the system is out-of-phase, the output terminal 3 of the out-of-phase trigger OFT, via conductors 111, 112 and 91 also is connected to said "or " gate G11 for blocking switch S to prevent printing during the out-of-phase condition during repetition.

In the event a special service signal "I" is received over channel AA, this special service signal "I," if not inverted, is conducted via "and" gate G13 connected to trigger circuit RT and conductor 85 to special service signal "I" detector DIO which correspondingly operates, via conductor 69, the RQ and BQ switching devices of the corresponding transmitter channel AA, as well as operates via conductor 86 and "or" gate G10 the repetition device RD, and thence through conductor 77 and "or" gate G11 to operate the blocking switch S to block the printer. Furthermore, via conductor 92, the detector DIO controls the operation of the phasing part of the circuit in FIG. 2*b*, as will be described later.

In the event an inverted special service signal "I" is received in the receiving trigger circuit RT of channel AA receiver, it is passed through "and" gate G14 and conductor 87 to an inverted special service signal detector circuit IIO, the output of which is connected via conductors 93 to FIG. 2B, also for controlling a part of the phasing part of the circuit as will be described.

II–D.—THE PHASING CIRCUITS

1.—OUT-OF-PHASE DETECTION

Only when this system is in repetition with all of its channels, and a complete signal cycle is received at the aggregate signal receiving trigger AS, is the out-of-phase detector OFD in the FIG. 2*b* operated. This out-of-phase detector OFD is controlled via conductor 100 by "and" gate G12, which gate is controlled by (a) the repetition for all of the four channel receiving circuits AA through DD via conductor 90 from FIG. 2*c*, (b) each marking element received over the aggregate receiving trigger AS via conductors 12 and 102, and (c) the 100 cycle per second pulses *op'* from the receiver pulse generator OP via conductor 103. Thus, when all of these conditions exist, all of the positive or marking elements received from the radio receiver 15 are conducted successively to the out-of-phase detector OFD to operate the chain of six counting triggers F1 through F6 comprising a $2^6$ binary counter, connected to count up to 56 elements, in accordance with the wave forms *f1* through *f6* of the outputs from the six counting triggers F1 through F6 shown in the upper central portion of FIG. 2*b* adjacent said out-of-phase detector OFD. The output connections from these triggers are so arranged via "and" gate 15 in this detector OFD circuit, that after 56 successive marking elements are counted, that is, half of all of the 112 elements in a complete system cycle according to the unique pattern of the above table, an impulse *p56* (see waveform *f6*) is conducted via conductor 105 "and" gate G16 is also connected with the pulses *pc4* which are generated at the end of each system cycle in the receiver system cycle counter circuit SCCO in FIG. 2*a* from the trigger C4 (see wave form *pc4* adjacent said counter circuit SCCO), which pulses *pc4* are conducted via conductor 106 to said "and" gate G16. These pulses *pc4* are also conducted to the out-of-phase detector OFD via branch conductor 107 for re-setting the triggers F1 through F6 at the end of each system cycle. Also connected to the "and" gate G16 is a normally applied potential from the inverter circuit IN, which inverter IN is only blocked when all of the receiver channel circuits AA through DD are receiving normal (not inverted) special service signals "I" applied via conductors 92 through "and" gate G17. This occurs only when the system is in-phase.

Thus when a signal received is unmutilated while being in repetition the system can be in-phase or it can be out-of-phase. When the system is in-phase, all the channels show the normal special service signals "I," thus blocking the out-of-phase counter OFD at the "and" gate G16 by operating the inverter IN. When not in-phase not all the channels will show a normal special service sgnal "I" at the "and" gate G17, and the inverter IN will maintain the "and" gate G16 open for the impulse *pc4* to operate the out-of-phase trigger OFT into the "on" position.

During mutilated reception, the 56/56 mark/space ratio will most probably be disturbed at the moment the pulse *pc4* occurs at the end of the system cycle, so that the criterion of 56 marking elements per system cycle will not be present. Thus during faulty reception, the out-of-phase criterion will not show up. This however is not a drawback, since it is of no use to start the re-phasing on a mutilated signal and thus the out-of-phase trigger OFT will not be operated. Thus out-of-phasing can only occur in the event all of the channels are in repetition, that is, when there has been some mutilation in one of the elements of each of the signals of each channel, and therefore there is no means for maintaining the synchronism between the two circuits via the correction device CO on the elements.

Accordingly when the system is in repetition, and a complete system cycle of special service signals "I" has been received and all the receiving channel circuits have detected these signals "I" to be faulty so as not to operate all the detectors DIO in the receiving channel circuits AA–DD, the system is out-of-phase and the "and" gate G16 is opened, so that when the 56 marking elements have been counted, a potential is applied to the input of the out-of phase trigger OFT, which: applies a potential via conductor 111 to the reversing "and" gate G9 to invert all the special service signals "I" being transmitted from this station to indicate it is out-of-phase; applies a potential via branch conductor 112 to "or" gates G11 in each receiving channel circuit AA through DD in FIG. 2*c* to block their printers; and applies a potential via another branch conductor 113 to "and" gate G20 to operate the phase hunting trigger SE in FIG. 2*a*.

II–D–2.—RE-PHASING

When the out-of-phase trigger OFT is in its "on" position the out-of-phase situation exists. Under these conditions the potential conducted via conductor 111 branch conductor 113 to the "and" gate G20 in FIG. 2*a*, before the input to the phase hunting trigger SE via conductor 114, is only one of several potentials applied to this "and" gate G20 before the phase hunting trigger is operated. These other potentials which must be simultaneously applied to the "and" gate 20 to open it, include clock pulses *op'* via conductor 103 and branch conductor 115; the output potential from the character stopping trigger SC, which is normally "off," that is, having an output potential on its output terminal 4 applied via conductor 116 to the "and" gate G20; the output pulses of the last element trigger D7 for each character passing the receiving distributor OD via conductor 117; and the output potential from the channel indicating trigger D8 via branch conductor 118 from conductor 32. Thus during the second part of the last element of each character cycle, the clocking pulse *op'* opens the "and" gate G20 to put the phase trigger SE into its "on" position so as to block the "and" gate G1 so as to prevent one of the pulses *op* from reaching the distributor OD and thereby cause it to skip one signal element of one seven-element signal character, and thereby shift the phasing by this amount. The suppression of this impulse *op* will however throw the phasing trigger circuit SE back into its normal "off" position again, where it remains until the end of the next character cycle. This means that once per character cycle of seven-elements the receiving distributor skips or slips one element with respect to the incoming aggregate signal. Accordingly one element stepping per signal is now accomplished until an in-phase character cycle condition exists. Thus this element stepping continues for a maximum of 27 elements, or one character cycle for each of four channels, or until character cycle phase exists. When this is also in phase with the system cycle, either "and" gate G17 or "and" gate G18, depending whether this station is a master or slave station, respectively, will be opened, and the out-of-phase trigger OFT will then be put into its "off" position stopping the stepping.

However, if this character phase does not exist with the unique system cycle pattern of the above table, every receiving channel circuit AA through DD in FIG. 2*c* will either detect a normal special service signal "I" or an inverted special service signal "I," (but not all direct or all inverted because of the pattern) and all "or" gates G21 through G24 connected to the "and" gate G25 in FIG. 2*b* to the input of the character phase detector CP will then be conductive to put said character phase detecting trigger CP into its "on" position. The output of this character phase detector CP is then conducted via conductor 121 to the input of the character stepping trigger SC in FIG. 2*a*, which then blocks both the "and" gates G2 and G20, by removing the potentials therefrom, so that the receiver channel indicator CIO remains inoperative while the distributor OD continues to operate without slipping or skipping until a system cycle in-phase condition is detected. When after one character cycle, there still is no system cycle synchronism, the triggers CP and SC remain in their "on" positions and the process goes on for another character cycle, thus stepping the whole character cycle at a time until system cycle pattern synchronism is reached. This can last for a maximum of only three character cycles since there are only four character cycles in each system cycle.

A system cycle pattern in-phase condition is detected at a station when an input potential is applied over conductor 122 through switch SW2 from either "and" gate G17 when all channels have detected a direct special service signal "I," or "and" gate G18 when all channels have detected an inverted special service signal "I," depending upon whether this station is a master or a slave station, respectively. This potential in conductor 122 puts the out-of-phase trigger OFT into its "off" position, which removes the potential from conductors 111 and its branches and applies potential to conductor 125 from its output terminal 4 to cut off the character phase detector trigger CP and via branch conductor 126, re-open direct "and" gate G3 to the keyer K so it will again transmit characters in the normal way.

When the keying takes place through reversed "and" gate G9, it is impossible for a remote station to receive a correct normal special service signal "I" on all the channels, but a correct inverted special service signal "I" on all the channels can be received by a slave station for rephasing it correctly. This means that the slave station always phases itself first, and then the master station can phase itself.

Although the above described specific example of this invention was for a seven-element constant-ratio character and for a unique system cycle pattern of four character cycles, the specific ratio and number of elements per character, number of characters per system cycle, number of channels, and the system cycle pattern can be changed without departing from the scope of this invention.

While there is described above the principles of this invention in connection with specific apparatus, it is to be clearly undertstood that this description is made only by way of example and not as a limitation to the scope of this invention.

What is claimed is:

1. In a synchronous two-way multi-channel telecommunication system for communicating equal multi-element binary code signals in a predetermined multi-channel cyclic pattern between a master station and a slave station, each station having:

(a) a transmitter,
(b) a receiver, and
(c) an automatic signal error detection and repetition device, the improvement comprising at each station:

(d) means for detecting loss of synchronism in said pattern during repetition operation, and
(e) means connected to said loss of synchronism detecting means and to said repetition device for correcting said synchronism by skipping the time for at least one signal element at a time until said pattern synchronism is restored

2. A system according to claim 1 wherein said correcting means includes means for first correcting the synchronism in said slave station, and then correcting the synchronism in said master station.

3. A system according to claim 1 wherein said correcting means includes means for inverting all the signals transmitted until synchronism is corrected in the slave station.

4. A system according to claim 1 wherein said signal elements have direct and inverted polarities, and wherein said predetermined cyclic pattern comprises a system cycle of a number of character cycles equal to the number of signals in a repetition cycle to produce a pattern of direct and inverted polarity signal elements which is unique for each character cycle for all the channels in each system cycle.

5. A four channel system according to claim 4 wherein said pattern of inversion consists of inverting only the first signal in the first character cycle of the first channel, inverting all but the second signal in the second character cycle of the second channel, inverting all but the third signal in the third character cycle of the third channel, and inverting only the fourth signal of the fourth character cycle of the fourth channel.

6. A system according to claim 4 wherein said receiver includes a distributor, and said correcting means includes means for interrupting the stepping of said receiver distributor one signal element at a time for one character cycle and then one character cycle at a time until synchronism is obtained.

7. A system according to claim 1 wherein said loss of synchronism detecting means is connected to receive all of the received signals of all channels and to said repetition device, and includes a signal element counter for all of the signal elements in a system cycle.

8. A system according to claim 1 wherein said automatic signal error detection and repetition device includes a special signal generator in each transmitter, and a special signal detector in each receiver, said special signal detector being connected to said correcting means.

9. A synchronous two-way multi-channel telecommunication system for communicating equal multi-element binary code signals in a predetermined multi-channel cyclic inversion pattern between a master station and a slave station, each station comprising a transmitting part and a receiving part, (A) each transmitting part comprising:
  (1) a transmitting distributor for said signals to be transmitted,
  (2) a transmitting channel indicator connected to and controlled by said transmitting distributor, and
  (3) a transmitting system cycle counter connected to and controlled by said transmitting distributor, and
  (4) a common keyer connected to and controlled by said transmitting system cycle counter, all common for all channels, and for each channel,
  (5) a transmitting register for signals to be transmitted connected to and controlled by said transmitting distributor through said transmitter channel indicator, and connectable to said keyer,
  (6) a storage device for the last few of said transmitted signals connected to said transmitter register, and connectable to said keyer,
  (7) a special signal generator connectable to said keyer,
  (8) a repetition means for controlling said connections to said keyer for repeating signals which have been indicated to have been received faulty at a remote station;

(B) each receiving part comprising:
  (1) a receiving distributor for said signals which are received,
  (2) a receiving channel indicator connected to and controlled by said receiving distributor,
  (3) a receiving system cycle counter connected to and controlled by said receiving distributor, and
  (4) a receiving trigger for all said received signals; all common for all channels, and for each channel,
  (5) a reeciving register connected to and controlled by said receiving trigger, said receiving system cycle counter and said receiving channel indicator,
  (6) a transferring circuit for properly received signals connected to said receiving register,
  (7) a fault detector for detecting improperly received signals connected to said receiving register,
  (8) a special signal detector connected to and controlled by said receiving register for detecting special signals received from a remote station, and
  (9) a repetition device connected to and controlled by one of said detectors, which detector is also connected to said repetition means in the corresponding channel of said transmitting part for controlling the same; and
  (10) a signal element out-of-phase means connected to all received signals, and connected to and controlled by each of said channel repetition devices, and connected to said keyer and said receiving distributor for re-setting the synchronism of said stations when synchronism is lost during signal repetition operations by skipping the time for at least one signal element at a time until said pattern synchronism is restored.

10. A system according to claim 9 wherein said means for resetting synchronism includes means for synchronizing the master station after the slave station is in synchronism.

11. A system according to claim 9 wherein said means for resetting the synchronism includes a counter for each element of a given polarity of each signal in one system cycle of said pattern.

12. A system according to claim 9 wherein said means for resetting the synchronism includes a trigger means connected to said keyer for inverting all signals transmitted until synchronism of the slave station is obtained.

13. A system according to claim 9 wherein said signal elements have direct and inverted polarities, and wherein said predetermined cyclic pattern comprises a system cycle of a number of character cycles equal to the number of signals in a repetition cycle to produce a pattern of direct and inverted polarity signal elements which is unique for each character cycle for all the channels in each system code.

14. A four channel system according to claim 13 wherein said pattern of inversion consists of inverting only the first signal in the first character cycle of the first channel, inverting all but the second signal in the second character cycle of the second channel, inverting all but the third signal in the third character cycle of the third channel, and inverting only the fourth signal in the fourth character cycle of the fourth channel.

15. A system according to claim 9 wherein said means for resetting the synchronism includes a trigger means connected to said receiving distributor for interrupting the stepping of said distributor one signal element at a time for one character cycle until character synchronism is obtained, and then for interrupting the stepping of said remaining distributor one character cycle of a time for one cycle of said pattern until pattern synchronism is obtained.

16. A system according to claim 9 wherein said repetition device includes means for controlling said repetition means to connect said special signal generators in all said channels to said keyer to transmit only said special signals as long as said system is out of synchronism.

17. A system according to claim 9 wherein said repetition device includes means for controlling said repetition means to connect first said special signal generator and then said storage device to said keyer to transmit first said special signal and then repeat the transmission of the said last few transmitted signals stored in said storing device to indicate that synchronism has been established at that station.

18. In a synchronous two-way multi-channel telecommunication system for communicating equal multi-element binary code signals in a predetermined multi-channel cyclic pattern between a master station and a slave station, each station having:
  (a) a transmitter,
  (b) a receiver, and
  (c) an automatic signal error detection and repetition device, the improvement comprising at each station:
  (d) means for detecting loss of synchronism in said pattern during repetition operation,
  (e) means for inverting all signals at both stations when said loss of synchronism has been detected, and
  (f) means connected to said loss of synchronism detecting means and to said repetition device for correcting said synchronism by skipping the time for at least one signal element at a time until the pattern synchronism is restored, said pattern synchronism being restored first on said inverted signals.

19. A system according to claim 18 wherein said correcting means includes means for first correcting the synchronism in said slave station on said inverted signals, and then correcting the synchronism in said master station.

20. A system according to claim 18 wherein said loss of synchronism detecting means includes means for transmitting special service signals on all channels which special service signals have been inverted, and wherein said means for correcting said synchronism includes means for detecting said inverted special service signals.

21. A system according to claim 20 wherein said means for correcting said synchronism on said inverted signals is at the slave station and includes means for re-inverting said special service signals to direct special service signals after synchronism is obtained, and said means for correcting said synchronism includes means at the master station for detecting said direct special service signals for correcting said synchronism on said direct service signals.

22. A system according to claim 4 wherein said correcting means includes means for detecting correct polarity in the character cycle of two adjacent channels according to said pattern.

References Cited by the Examiner

UNITED STATES PATENTS

| | | | |
|---|---|---|---|
| 2,934,604 | 4/1960 | Bizet | 178—53 |
| 2,988,596 | 6/1961 | Van Dalen | 340—146.1 |
| 3,154,638 | 10/1964 | Van Dalen | 340—146.1 |
| 3,156,767 | 11/1964 | Van Duuren | 178—58 |

DAVID G. REDINBAUGH, *Primary Examiner.*

S. J. GLASSMAN, *Assistant Examiner.*